(12) United States Patent
Spencer et al.

(10) Patent No.: US 7,035,981 B1
(45) Date of Patent: Apr. 25, 2006

(54) ASYNCHRONOUS INPUT/OUTPUT CACHE HAVING REDUCED LATENCY

(75) Inventors: Thomas V Spencer, Ft Collins, CO (US); Monish S Shah, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/218,333

(22) Filed: Dec. 22, 1998

(51) Int. Cl.
*G06F 13/00* (2006.01)

(52) U.S. Cl. .................. 711/144; 711/145; 711/141; 711/147; 711/167; 711/130; 711/162; 709/400; 713/400; 713/502; 713/600; 710/19; 710/27; 710/55; 710/61; 710/107; 710/125; 710/200; 710/240; 710/244; 710/305

(58) Field of Classification Search .................. 711/144, 711/145, 141, 142, 146, 147, 149, 151, 154, 711/156, 158, 163, 130–131, 167; 710/107, 710/118, 125, 128, 130, 200, 240, 244, 19, 710/27, 32, 55, 61; 713/400, 500, 600, 502; 709/400
See application file for complete search history.

(56) References Cited

U.S. PATENT DOCUMENTS

| | | | | |
|---|---|---|---|---|
| 5,067,078 A | * | 11/1991 | Talgam et al. ............... 711/3 |
| 5,195,089 A | * | 3/1993 | Sindhu et al. ............. 370/235 |
| 5,319,768 A | * | 6/1994 | Rastegar .................... 711/131 |
| 5,446,863 A | | 8/1995 | Stevens et al. ............ 711/100 |
| 5,491,811 A | * | 2/1996 | Arimilli et al. ............ 711/144 |
| 5,513,335 A | * | 4/1996 | McClure .................... 711/130 |
| 5,551,000 A | * | 8/1996 | Tan et al. .................. 711/118 |
| 5,608,878 A | | 3/1997 | Arimilli et al. ............ 710/107 |
| 5,673,414 A | | 9/1997 | Amini et al. .............. 711/146 |
| 5,692,152 A | * | 11/1997 | Cohen et al. .............. 711/140 |
| 5,724,549 A | | 3/1998 | Selgas et al. .............. 711/141 |
| 5,809,022 A | | 9/1998 | Byers et al. ............... 370/395 |
| 5,822,606 A | * | 10/1998 | Morton ....................... 712/16 |
| 5,895,469 A | * | 4/1999 | Lahti et al. ................. 710/52 |

* cited by examiner

*Primary Examiner*—Hong Kim

(57) ABSTRACT

The present invention is generally directed to a device including an asynchronous input/output (I/O) data cache. The device includes a single data storage area that is disposed in communication with both a system data bus and a I/O data bus. Similarly, the device includes an address storage area that is configured to store system addresses corresponding to data contemporaneously stored in the data storage area. The device further includes a first circuit configured to indicate validity status of data within the data storage area for immediate access from the I/O data bus. A similar, second circuit is also included and configured to indicate validity status of data within the data storage area for immediate access from the system data bus. In accordance with another aspect of the present invention, a method is provided for buffering or caching data in a shared relationship between a system data bus and an input/output (I/O) data bus, which includes the steps of providing a single data storage area in communication with both a system data bus and an I/O data bus, and providing a single address storage area configured to store system memory addresses corresponding to data contemporaneously stored in the data storage area. In accordance with the broad aspect of the invention, the method further replicates a portion of validation circuitry in both a system frequency domain and an I/O frequency domain. In this way, latency delays encountered when crossing a frequency domain boundary are encountered at times outside a critical path.

15 Claims, 3 Drawing Sheets

ASYNCHRONOUS INPUT/OUTPUT CACHE HAVING REDUCED LATENCY

BACKGROUND OF THE INVENTION

1. Field of the Invention

The present invention generally relates to cache memories, and more particularly to an asynchronous input/output cache memory having reduced latency in both the system frequency domain and the input/output (I/O) frequency domain.

2. Discussion of the Related Art

The driving force behind computer system innovation has been the demand for faster and more powerful computers. A major bottleneck in computer speed has historically been the speed with which data can be accessed from memory, referred to as the memory access time. The microprocessor, with its relatively fast processor cycle times, has generally been delayed by the use of wait states during memory accesses to account for the relatively slow memory access times. Therefore, improvement in memory access times has been one of the major areas of research in enhancing computer performance.

In order to bridge the gap between fast processor cycle times and slow memory access times, cache memory was developed. A cache memory is a small amount of very fast, and expensive, zero wait state memory that is used to store a copy of frequently accessed code and data from main memory. The microprocessor can operate out of this very fast memory and thereby reduce the number of wait states that must be interposed during memory accesses. When the processor requests data from memory and the data resides in the cache, then a cache read hit takes place, and the data from the memory access can be returned to the processor from the cache without incurring wait states. If the data is not in the cache, then a cache read miss takes place. In a cache read miss, the memory request is forwarded to the system, and the data is retrieved from main memory, as would normally be done if the cache did not exist. On a cache miss, the data that is retrieved from memory is provided to the processor and is also written into the cache due to the statistical likelihood that this data will be requested again by the processor.

An efficient cache yields a high "hit rate" which is the percentage of cache hits that occur during all memory accesses. When a cache has a high hit rate, the majority of memory accesses are serviced with zero wait states. The net effect of a high cache hit rate is that the wait states incurred on a relatively infrequent miss are averaged over a large number of zero wait state cache hit accesses, resulting in an average of nearly zero wait states per access. Also, since a cache is usually located on the local bus of the microprocessor, cache hits are serviced locally without requiring use of the system bus. Therefore, a processor operating out of its local cache has a much lower "bus utilization." This reduces system bus bandwidth used by the processor, making more bandwidth available for other devices, such as intelligent bus masters, which can independently gain access to the bus.

Although processor caches are perhaps the best known, other caches are known and used as well. For example, I/O caches are known for buffering and caching data between a system bus and an I/O bus. As will be further described below, certain system components, like a microprocessor and memory, are synchronized off a different clock than I/O transactions. When passing data between two differing frequency domains, it is usually desirable, if not necessary, to buffer the data in some way. One way that this is done is by passing the data through an I/O cache.

Whether it be a processor cache, an I/O cache, or some other type of cache memory, important considerations in cache performance are the organization of the cache and the cache management policies that are employed in the cache. A cache can generally be organized into either a direct-mapped or set-associative configuration. In a direct-mapped organization, the physical address space of the computer is conceptually divided up into a number of equal pages, with the page size equaling the size of the cache. The cache is partitioned into a number of sets, with each set having a certain number of lines. The line size is generally a plurality of bytes or words. Each of the conceptual pages in main memory has a number of lines equivalent to the number of lines in the cache, and each line from a respective page in main memory corresponds to a similarly located line in the cache. An important characteristic of a direct-mapped cache is that each memory line from a conceptual page in main memory, referred to as a page offset, can only reside in the equivalently located line or page offset in the cache. Due to this restriction, the cache only need refer to a certain number of the upper address bits of a memory address, referred to as a tag, to determine if a copy of the data from the respective memory address resides in the cache because the lower order address bits are pre-determined by the page offset of the memory address.

Cache management is generally performed by a device referred to as a cache controller. One cache management duty performed by the cache controller is the handling of processor writes to memory. The manner in which write operations are handled determines whether a cache is designated as "write-through" or "write-back." When the processor initiates a write to main memory, the cache is first checked to determine if a copy of the data from this location resides in the cache. If a processor write hit occurs in a write-back cache design, then the cache location is updated with the new data, and main memory is only updated later if this data is requested by another device, such as a bus master. Alternatively, the cache maintains the correct or "clean" copy of data thereafter, and the main memory is only updated when a flush operation occurs. In a write-through cache, the main memory location is generally updated in conjunction with the cache location on a processor write hit. If a processor write miss occurs to a write-through cache, the cache controller may either ignore the write miss or may perform a "write-allocate," whereby the cache controller allocates a new line in the cache in addition to passing the data to the main memory In a write-back cache design, the cache controller generally allocates a new line in the cache when a processor write miss occurs. This generally involves reading the remaining entries from main memory to fill the line in addition to allocating the new write data.

The cache controller includes a directory that holds an associated entry for each set in the cache. In a write-through cache, this entry generally has three components: a tag, a tag valid bit, and a number of line valid bits equaling the number of lines in each cache set. The tag acts as a main memory page number, and it holds the upper address bits of the particular page in main memory from which the copy of data residing in the respective set of the cache originated. The status of the tag valid bit determines whether the data in the respective set of the cache is considered valid or invalid. If the tag valid bit is clear, then the entire set is considered invalid. If the tag valid bit is true, then an individual line within the set is considered valid or invalid depending on the status of its respective line valid bit. In a write-back cache, the entries in the cache directory are generally comprised of a tag and a number of tag state bits for each of the lines in each set. As before, the tag comprises the upper address bits of the particular page in main memory from which the copy originated. The tag state bits determine the status of the data for each respective line, i.e., whether the data is invalid, modified (owned), or clean.

A principal cache management policy is the preservation of cache coherency. Cache coherency refers to the requirement that any copy of data in a cache must be identical to (or actually be) the owner of that location's data. The owner of a location's data is generally defined as the respective location having the most recent or the correct version of data. The owner of data is generally either an unmodified location in main memory, or a modified location in a write-back cache.

In computer systems where independent bus masters can access memory, there is a possibility that a bus master, such as a direct memory access controller, network or disk interface card, or video graphics card, might alter the contents of a main memory location that is duplicated in the cache. When this occurs, the cache is said to hold "stale," "dirty" or invalid data. Also, when the processor executes a cache write hit operation to a write-back cache, the cache receives the new data, but main memory is not updated until a later time, if at all. In this instance, the cache contains a "clean" or correct version of the data and is said to own the location, and main memory holds invalid or "dirty" data. Problems would arise if the processor was allowed to access dirty data from the cache, or if a bus master was allowed to access dirty data from main memory. Therefore, in order to maintain cache coherency, i.e., in order to prevent a device such as a processor or bus master from inadvertently receiving incorrect or dirty data, it is necessary for the cache controller to monitor the system bus for bus master accesses to main memory when the processor does not control the system bus. This method of monitoring the bus is referred to as snooping.

In a write-back cache design, the cache controller must monitor the system bus during memory reads by a bus master because of the possibility that the cache may own the location, i.e., the cache may contain the only correct copy of data for this location, referred to as modified data. This is referred to as read snooping. On a read snoop hit where the cache contains modified data, the cache controller generally provides the respective data to main memory, and the requesting bus master generally reads this data en route from the cache controller to main memory, this operation being referred to as snarfing. Alternatively, the cache controller provides the respective data directly to the bus master and not to main memory. In this alternative scheme, the main memory would perpetually contain erroneous or "dirty" data until a cache flush occurred.

In both write-back and write-through cache designs, the cache controller must also monitor the system bus during bus master writes to memory because the bus master may write to or alter a memory location having data that resides in the cache. This is referred to as write snooping. On a write snoop hit to a write-through cache, the cache entry is generally marked invalid in the cache directory by the cache controller, signifying that this entry is no longer correct. In a write-back cache, the cache is updated along with main memory, and the tag states bits are set to indicate that the respective cache location now includes a clean copy of the data. Alternatively, a write-back cache may invalidate the entire line on a snoop write hit. Therefore, in a write-back cache design, the cache controller must snoop both bus master reads and writes to main memory. In a write-through cache design, the cache controller need only snoop bus master writes to main memory.

The process of snooping generally entails that the cache controller latch the system bus address and perform a cache look-up in the tag directory corresponding to the page offset location where the memory access occurred to see if a copy of data from the main memory location being accessed also resides in the cache. If a copy of the data from this location does reside in the cache, then the cache controller takes the appropriate action depending on whether a write-back or write-through cache design has been implemented, or whether a read or write snoop hit has occurred. This prevents incompatible data from being stored in main memory and the cache, thereby preserving cache coherency.

Another problem that occurs where cache systems are utilized is that, when the respective processor is not in control of the system bus, the cache must be able to both service local requests from the processor and snoop the system bus for memory accesses by other devices. Latency problems can arise where the processor is operating out of the cache and a snooping operation is required due to a pending bus master memory access cycle on the system bus. If the cache is busy servicing a processor access while a bus master memory access is occurring on the bus, the processor access may not complete before the respective bus master cycle completes. If this occurs, the cache will miss a snoop cycle, thus resulting in potential erroneous data in the cache and possible erroneous operation. This condition is exacerbated when logic external to the cache controller controls cache snoop accesses to the system bus.

As previously mentioned, an I/O cache may be utilized to buffer data that is communicated between a system frequency domain and an I/O frequency domain. To illustrate the manner in which such I/O caches have been implemented in the past, reference is made to FIGS. 1A and 1B. Generally, the I/O cache 2 is designed to reside completely within either the system frequency domain (FIG. 1A) or completely within the I/O frequency domain (FIG. 1B). Devices such as system memory 4 and a CPU 6 are synchronized to a system clock operating at a first (system) frequency, while I/O devices, or communications across an I/O bus 10 occur at a second (I/O) frequency. The differing clock frequencies characterize a frequency "domain" for the relative devices.

As is known, when data or signals are passed across a frequency domain boundary 16, a delay or latency is encountered. Normally, this latency is on the order of a couple of clock cycles. By way of example, when a system is constructed as illustrated in FIG. 1A, latency delays are encountered when data from the system memory 4 is fetched from devices on the I/O bus. If a block of data is requested, the latency delays are repeatedly encountered, as byte after byte of data is retrieved from the cache 2 to the I/O bus 10. Alternatively, when a system is constructed as illustrated in FIG. 1B, latency delays are encountered on the system data bus 8 side of the system in connection with reads and writes that occur in connection with the snoopy cache coherency protocol and operations.

Accordingly, it is desired to provide an I/O cache that minimizes the latency on both the system side of the cache (i.e., latency associated with snoopy cache coherency) and the I/O side of the cache (i.e., latency associated with I/O reads).

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a device including an asynchronous input/output (I/O) data cache. In accordance with one aspect of the invention, the device includes a single data storage area that is disposed in communication with both a system data bus and I/O data bus. Similarly, the device includes an address storage area that is configured to store system addresses corresponding to data contemporaneously stored in the data storage area. The device further includes a first circuit configured to indicate validity status of data within the data storage area for immediate access from the I/O data bus. A similar, second circuit is also included and configured to indicate validity status of data within the data storage area for immediate access from the system data bus.

Conceptually, the first circuit is located with the I/O frequency domain, while the second circuit is located within the system frequency domain. In operation, the device minimizes the adverse effects associated with the latency delays that are encountered when signals or data are communicated across a frequency domain boundary. In this regard, the device operates so that the latency delays are primarily encountered during non-critical times. Preferably, the device is configured so that the validity status of the data stored within the data storage area never appears valid from the I/O data bus, without first appearing valid from the system data bus. State machines, or other specially configured logic may be provided to generate validate or invalidate signals to represent when data within the data storage area is valid or invalid. The device, in one embodiment, further includes a register having an output that in responsive to both the validate and the invalidate signals. Preferably, this register is in the form of a clear/set register, whereby the invalidate signal is operative to clear the register output and the validate signal is operative to set the register output. In fact, one such register may be provided in the I/O domain side of the device, while a similar register may be provided on the system domain side of the device.

In accordance with another aspect of the present invention, a method is provided for buffering or caching data in a shared relationship between a system data bus and an input/output (I/O) data bus. In accordance with this aspect of the invention, the method includes the steps of providing a single data storage area in communication with both a system data bus and an I/O data bus, and providing a single address storage area configured to store system memory addresses corresponding to data contemporaneously stored in the data storage area. In accordance with the broad aspect of the invention, the method further replicates a portion of validation circuitry in both a system frequency domain and an I/O frequency domain. In this way, latency delays encountered when crossing a frequency domain boundary are encountered during non-critical times.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1A:
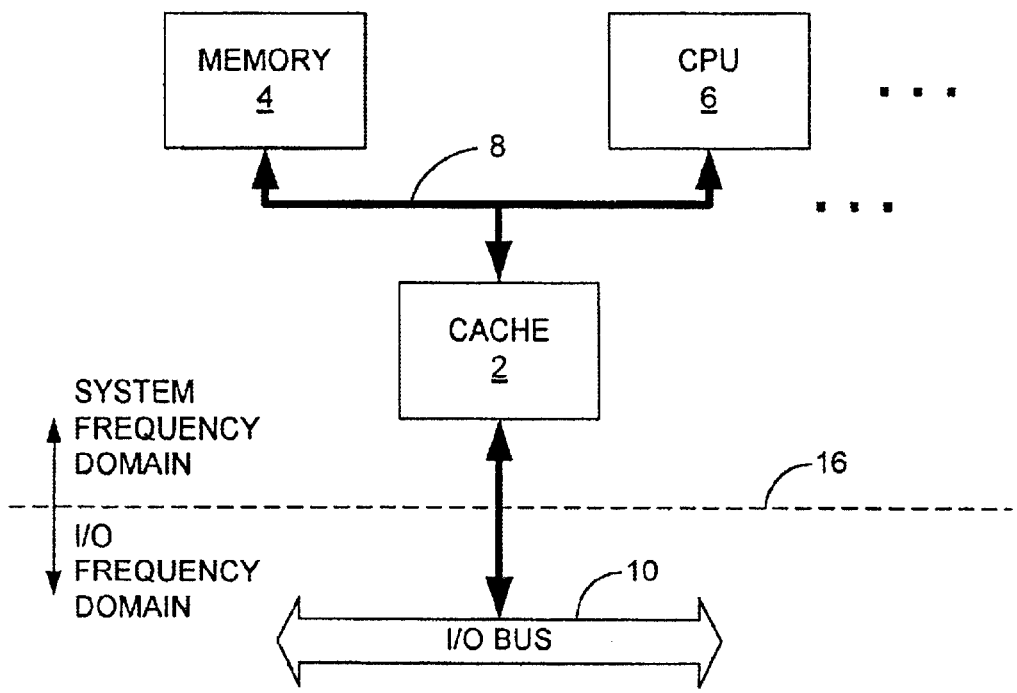
FIGS. 1A and 1B are block diagrams of systems having an I/O cache memory, as known in the prior art.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 2:
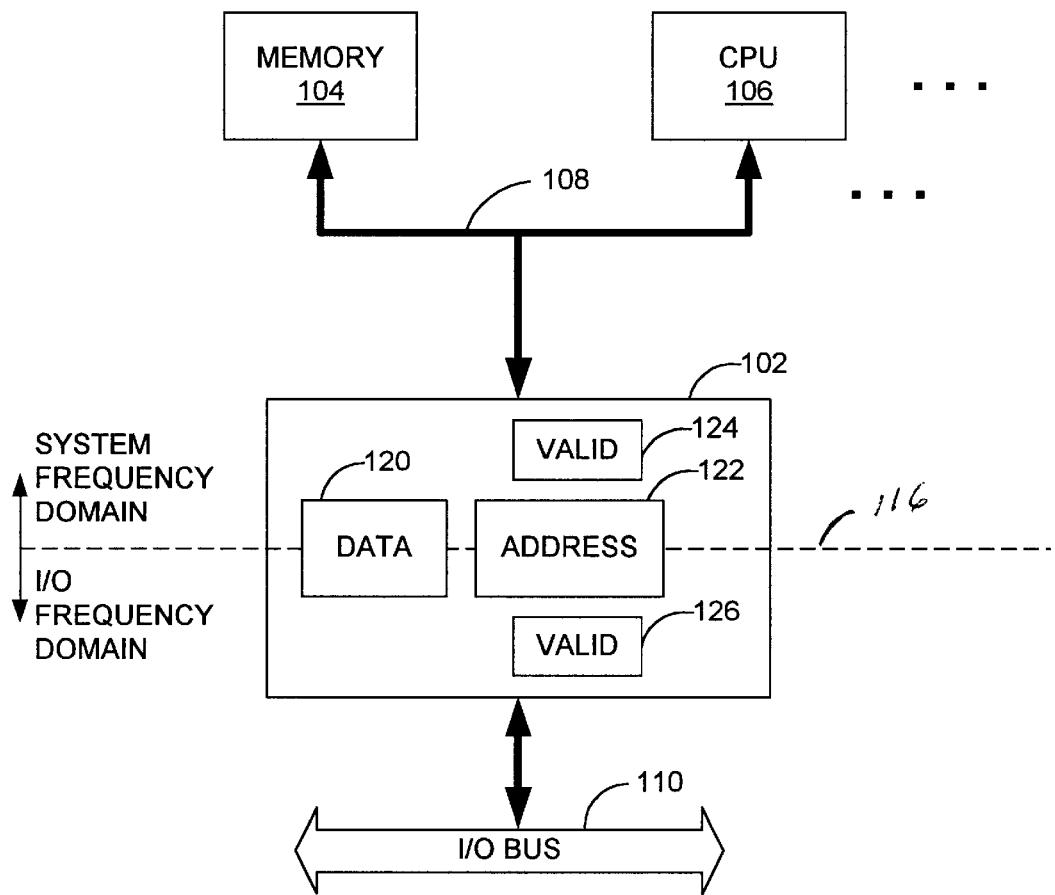
FIG. 2 is a block diagram of an I/O cache system constructed in accordance with the present invention.

Reference is now made to FIG. 2, which is a block diagram that illustrates a top-level view of a system 100 constructed in accordance with the concepts and teachings of the present invention. More particularly, the invention comprises an apparatus 102 that is particularly configured to be interposed between a system bus 108 and an I/O bus 110. As will be appreciated by persons skilled in the art, the system bus 108 is a grouping of conductors that provides a means for intercommunicating among a number of devices in a computing system, such as a memory 104, a CPU 106, as well as other devices. In similar fashion, the I/O bus 110 is a grouping of conductors that provides a means for the devices 104, 106 on the system bus 108 to intercommunicate with other, remote devices.

For example, in a computing environment such as a personal computer, a system is frequently provided having a motherboard that contains certain system components, such as a memory and CPU, on a motherboard. To accommodate a variety of differing "expansion" cards, a plurality of expansion slots are provided on the motherboard as well. Such expansion cards may include disk drive controllers, modems and other communication cards, etc. While some cards or devices such as these may intercommunicate with the CPU and memory via the system bus 108, others often communicate via an I/O bus, such as a PCI bus.

Figure 1B:
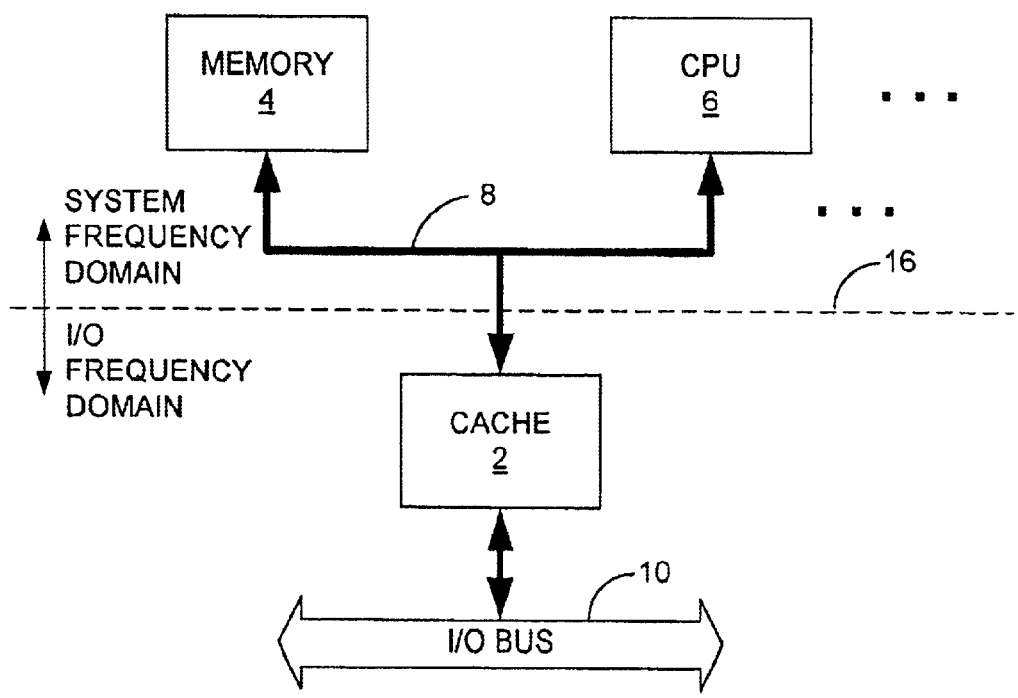

As is known, the devices that intercommunicate via the system bus 108 generally do so in a synchronous fashion, insofar as these devices operate from a common system clock. This is represented graphically in the figure by dashed line 116, whereby devices on the system side of line 116 are said to operate in a system frequency domain, which is the frequency of the system clock. Devices that intercommunicate across the I/O bus also do so in a synchronized fashion, but are synchronized to or with a different clock. Indeed, typically the I/O clock operates (frequently) at a different frequency than the system clock. Accordingly, devices on this side of the dashed line are said to operate in the I/O frequency domain. As mentioned above in connection with FIGS. 1A and 1B, a cache or other buffering device interposed between a system bus and an I/O bus was typically designed to operate in either the system frequency domain or the I/O frequency domain. As a result, certain latency penalties were paid when conducting operations or transactions that crossed the frequency boundary 116.

The present invention overcomes these latency shortcomings by providing a device 102 that effectively straddles the frequency boundary. In the broadest sense, the present invention can be viewed as a device having a cache data storage area 120 as well as an address (or tag) storage area 122 that straddles the frequency boundary 116. In this regard, it will be appreciated that the frequency boundary 116 is not so much a physical boundary as it is a conceptual boundary. When the data storage area 120 and address storage area 122 are characterized to straddle this boundary, it simply means that one set of data and one set of addresses are provided within a device 102, as opposed to duplicative sets of data and addresses. Advantageously, this minimizes the chip space required for accommodating duplicative data and address storage areas. What is duplicated, in connection with the present invention, is certain validity/status circuitry 124 and 126. Specifically, circuitry 124 is provided to indicate when data within the data storage area 120 is valid, from the perspective of the system bus 108. Likewise, circuitry 126 is provided to indicate when data within the data storage area 120 is valid from the perspective of the I/O bus 110. As will be appreciated from the discussion that follows, the present invention achieves its advantages by essentially hiding the latency that is incurred when crossing the frequency boundary 116. In this regard, the latency penalties are paid at non-critical times.

For example, when a fetch instruction or operation is executed, whereby a device seeks to fetch data from system memory 104 via the I/O bus 110, several cycles of delay are encountered in order to fetch the data across the frequency boundary 116. While this latency frequently is incurred for each successive byte of data that is fetched, the present invention effectively hides this latency by incurring it (from the prospective of the I/O bus 110) only in connection with the first data byte fetched. Subsequent data bytes may be fetched into the data storage area 120 and then retrieved by the I/O bus 110 with no subsequent latency periods encountered either. Similarly, and as will be further described below, the device 102 of the present invention operates in a manner that allows the snoopy coherency protocol to occur on the system side (between the system bus 108 and the device 102) without incurring latency delays during the critical periods.

Figure 3:
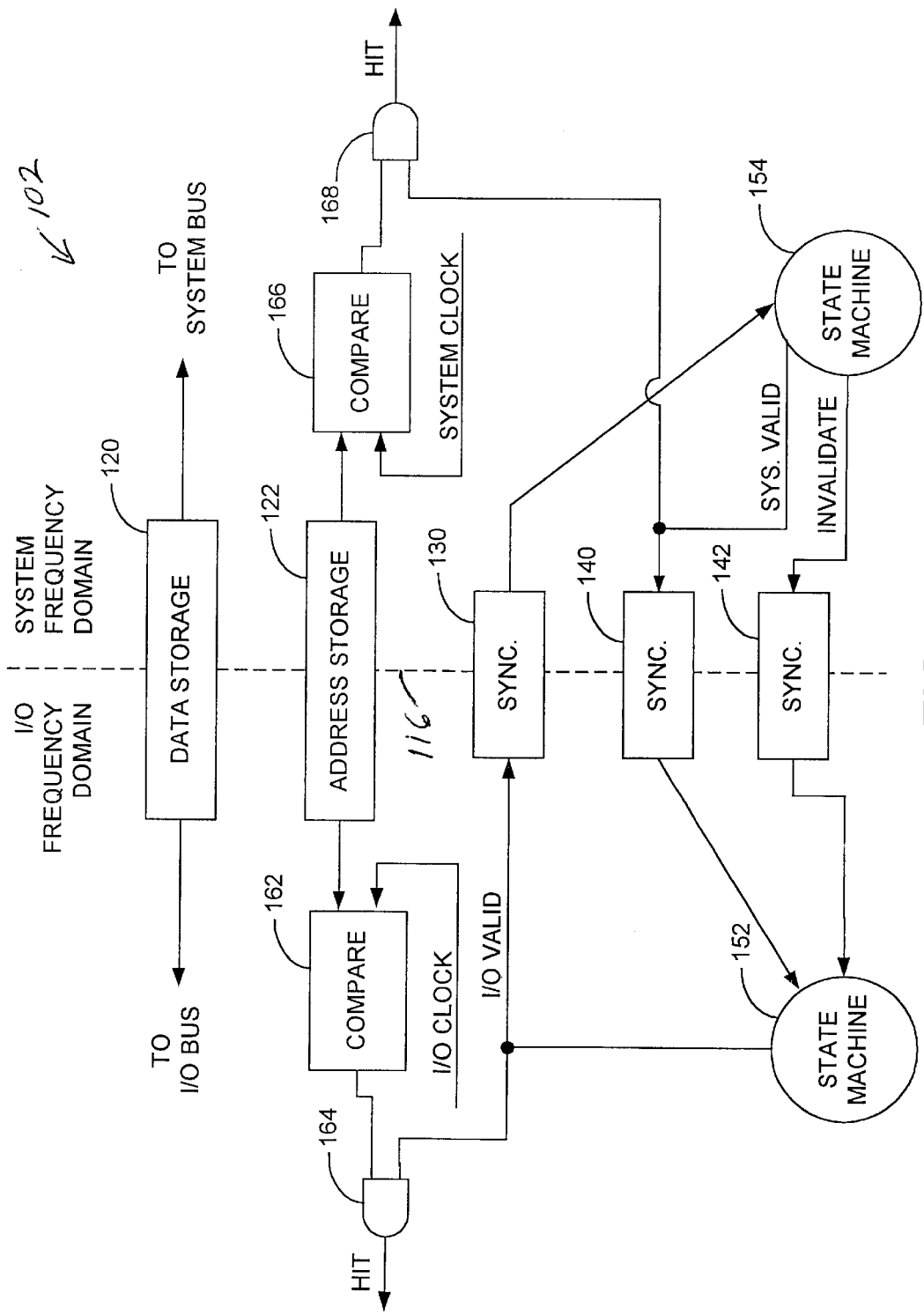
FIG. 3 is a block diagram of a device including an I/O cache, in accordance with the present invention.

Reference is now made to FIG. 3, which is a block diagram that more specifically illustrates the device 102 of the present invention. As previously mentioned, the device 102 includes a data storage area 120 and an address storage area 122 that, conceptually, straddle the frequency boundary 116 between the system frequency domain and the I/O frequency domain. In accordance with the inventive concepts, synchronization circuits 130 and 140 are provided that also, conceptually, straddle the frequency boundary 116.

Figure 4:
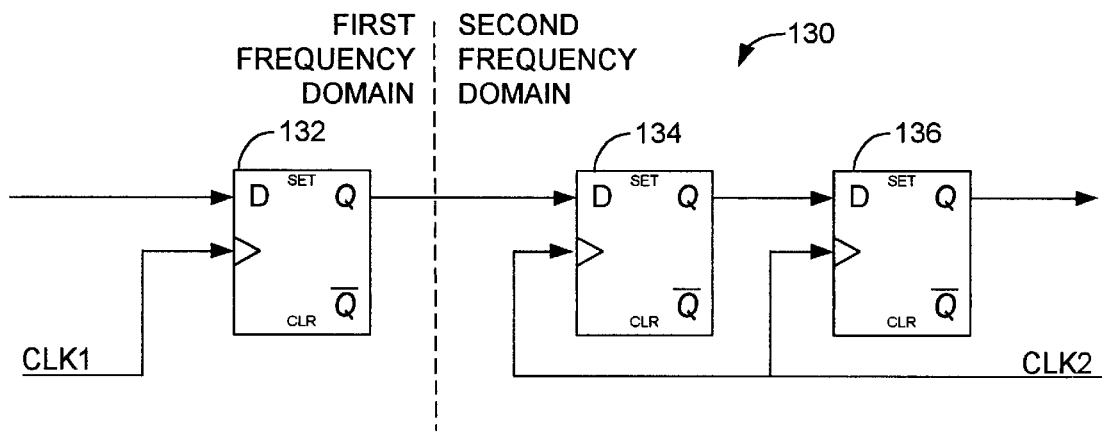
FIG. 4 is a schematic diagram of a synchronization circuit illustrated in FIG. 3.

In this regard, reference is made to FIG. 4 which is a schematic diagram illustrating that circuitry that may preferably comprise the synchronization circuit 130. Specifically, the synchronization block 130 preferably includes three flip-flops 132, 134, and 136, configured as illustrated. A signal that is passed from the I/O frequency domain (more generically denoted as the first frequency domain is clocked using a first clock (CLK1) into a D-type flip-flop 132. The output of this flip-flop is then directed to flip-flop 134, which is clocked by a second clock (CLK2), that is operating in the system frequency domain (or more generically denoted as the second frequency domain). A third flip-flop 136 is provided, whereby the output of flip-flop 134 is directed to the input of flip-flop 136. The purpose of flip-flop 136 is to overcome the potential effects of metastability of flip-flop 134. Specifically, if a signal clocked out of flip-flop 132 is clocked into flip-flop 134, without satisfying either the set up or hold requirements for flip-flop 134, then the output of flip-flop 134 may be metastable (i.e., neither a logic high nor a logic low). As is known, this metastability will typically resolve itself within the period of a clock cycle. Accordingly, coincident with the next clock cycle of CLK2, the output of flip-flop 134 will be settled at either a logic high or logic low, thereby providing a valid output at the output of flip-flop 136.

Returning to FIG. 3, similar synchronization circuits 140 and 142 are provided for signals passing the opposite direction from that of the synchronization circuit 130. As will be further described below, state machines 152 and 154 are provided to control the communication and synchronization of signals across the frequency boundary.

For purposes of illustration and simplification, only one set of signals has been illustrated in FIG. 3 for each of the frequency domains. However, it will be appreciated that, in the preferred embodiment, there will be duplicative circuitry and signals set for each line of data in the data storage area 120. An I/O device 102 constructed in accordance with the preferred embodiment, includes sixteen lines of cache data within the data storage area 120, each line containing sixty-four bytes of data. Accordingly, the validity/status circuitry partially illustrated herein will be replicated sixteen times.

As should be appreciated by persons of ordinary skill in the art, data within the data storage area 120 should never appear valid from the I/O side of the device 102 and not from the system side of the device 102. As will be appreciated from the diagram of FIG. 3, this status is insured by the configuration of the Invalidate, I/O Valid, and Sys. Valid signal lines. Broadly, when driving signals across the frequency boundary, the precise length of time that a signal should be asserted is uncertain. Therefore, it is preferred to provide some sort of feedback with the signaling. This is effectively achieved through the use of the Invalidate, I/O Valid, and Sys. Valid signal lines.

More specifically, state machine 154 generates both Sys. Valid and Invalidate signal lines, which initiate the indication that data is either valid or invalid from the system frequency domain. Both of these signals are passed through synchronization circuits 140 and 142, respectively, and input to state machine 152. State machine 152 generates an I/O Valid signal, which is directed to AND gate, 164, as well as being passed back to the system frequency domain via synchronization circuit 130.

By way of illustration, if, through a cache coherency check, it is determined that data within the data storage area is no longer valid (e.g., new data values written into system memory), then state machine 154 asserts the Invalidate signal line. This signal passes through synchronization circuit 142 and is input to state machine 152. In response, state machine 152 negates the I/O Valid signal line, immediately signaling in the I/O frequency band that the data is not valid. The I/O Valid signal is also directed to state machine 154, via synchronization circuit 130. Therefore, after a few clock cycle delay, the negated I/O Valid signal is input to state machine 154, which negates the Sys. Valid signal line in response. The Invalidate signal line may then be de-asserted. The Sys. Valid signal is directed to AND gate 168, to indicate in the system frequency domain that the data is no longer valid. The Sys. Valid signal is also directed to state machine 152 via synchronization circuit 140. Thus, through this signaling it is observed that the validity status of data within the data storage area 120 is first indicated as invalid on I/O side, before it is indicated as invalid on the system side.

Likewise, when data is retrieved from system memory into the data storage area 120, then state machine 154 may assert the Sys. Valid signal line. This signal is delivered to state machine 152, which asserts the I/O Valid signal line. Conversely, if data within the data storage area is to be marked as invalid from the I/O frequency domain side, then state machine 152 simply negates the I/O Valid signal (even without being first prompted by the Invalidate signal line). This immediately signals (via AND gate 164) in the I/O frequency that data in the data storage area 120 is not valid. Then, several cycles later, data will be indicated as invalid (via AND gate 168) in the system frequency domain.

Thus, state machines 152 and 154 are provided, which generate and control the status of the Invalidate, Sys. Valid, and I/O Valid signal lines. For example the first state machine 154 may be configured to generate an Invalidate signal in response to coherency transactions on the system data bus. The second state machine 152 may be configured to generate an I/O Valid signal in response to a completed fetch operation, whereby data is fetched from system memory into the data storage area. The specific circuitry used to implement the state machines 152 and 154 is not deemed to form part of the present invention, and therefore is not illustrated herein. Indeed, this circuitry may be implemented in a variety of different ways depending upon the particular application of device 102 and the particular implementation chosen for the device 102. Notwithstanding, persons of ordinary skill in the art should appreciate a number of ways to implement the state machines 152 and 154, and therefore a detailed discussion of the same is not necessary herein.

In addition, comparison circuitry 162, 164, 166, and 168 are provided to indicate whether particular data (as identified by an address) is presently within the data storage area 120. This circuitry may be implemented in a conventional manner, wherein comparison logic 162 is provided to determine whether a given address is presently within the address storage area 122. If so, the output of the comparator 162 is effectively "ANDed" with the validity status as reflected by the I/O Valid signal line. That is, in order to generate a "hit" for an I/O request, the address of the specified data must not only be present within the address storage area 122 (as determined by comparator 162), but that data must also be valid (as determined by state machines 152 and 154). Similarly, a request for data from the system side of the device 102 will result in a "hit" only if the address is present within the address storage area 122 (as determined by comparator 166) and the data status is valid (as determined by the state machines 152 and 154).

As will be appreciated, data requested from the I/O data bus typically will be fetched from system memory 104 into the data storage area 120. As previously mentioned, in the preferred embodiment, the I/O data bus 110 is a PCI bus. As is known, there is a mechanism provided in connection with PCI communications, whereby if data requested from system memory is not available with the cache of device 102, then the requesting circuitry will re-request the data several cycles later. Accordingly, if data requested from the PCI bus is not presently within the cache of the device 102, a hit (as reflected by gate 164) will not be generated. The system of the present invention will then request the data from system memory 104 and retrieve it into the data storage area 120. Then, a subsequent read from the PCI bus for that data will, in fact, generate a hit and data can be immediately read from the data storage area 120 to the PCI bus, without incurring latency. Consistent with the invention, data may be pre-fetched from the system memory 104 such that the latency associated with a fetch or request for data from the PCI bus is encountered only in connection with the initial fetch, and data from subsequent fetches may be immediately retrieved from the data storage area 120.

In the same way, as devices that are disposed in communication with the system bus 108 initiate requests for data from system memory 104, or write data to locations within a system memory 104, the device 102 of the present invention must ensure coherency of data between the system memory 104 and the data storage area 120. In a manner that is known, this coherency may be maintained through a snoopy cache coherency process. It will be appreciated from the foregoing discussion, that when a system address is presented to comparator 166 to determine whether data is presently located within the data storage area 120 (as specified by an address within the address storage area 122), the validity circuitry, including state machines 152 and 154, provide an immediate indication as to whether the data within the data storage area 120 is valid, without incurring the latency delays otherwise associated with crossing the frequency boundary 116. It will be appreciated that this advantageously provides for fast misdetection (i.e., data not in storage area 120) of data. However, if data is detected, then more information will need to be obtained and latency will be incurred. Since the present invention is employed in an I/O cache, however, the vast majority of the time, requested data will not be present in the cache, thereby obtaining the benefits of the quick misdetection the vast majority of the time.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An input/output (I/O) data cache comprising:
   a data storage area in communication with both a system data bus and an I/O data bus, wherein the data storage area is configured to store a non-duplicative data set;
   a single address storage area configured to store system addresses corresponding to data contemporaneously stored in the data storage area;
   a first circuit configured to indicate validity status of data within the data storage area for immediate access from the I/O data bus; and
   a second circuit configured to indicate validity status of data within the data storage area for immediate access from the system data bus, wherein the second circuit is configured such that the validity status of the data stored within the data storage area never appears valid from the I/O data bus, without first appearing valid from the system data bus.

2. The data cache as defined in claim 1, wherein the I/O data bus is a Peripheral Component Interconnect (PCI) bus.

3. The data cache as defined in claim 1, further including a first state machine configured to generate an invalidate signal in response to coherency transactions on the system data bus.

4. The data cache as defined in claim 3, further including a second state machine configured to generate an I/O Valid signal in response to a completed fetch operation, whereby data is fetched from system memory into the data storage area.

5. The data cache as defined in claim 4, further including synchronization circuitry comprising a plurality of registers configured to serially pass a signal value from one register to the next, wherein a first of the plurality of registers is clocked from a system clock and a second of the plurality of registers is clocked from an I/O clock.

6. The data cache as defined in claim 5, wherein the invalidate signal is passed through the plurality of registers in a direction from a system clock domain to an I/O clock domain.

7. The data cache as defined in claim 4, further including synchronization circuitry comprising a plurality of registers configured to serially pass a signal value from one register to the next, wherein a first of the plurality of registers is clocked from an I/O clock and a second of the plurality of registers is clocked from a system clock.

8. The data cache as defined in claim 7, wherein the validate signal is passed through the plurality of registers in a direction from an I/O clock domain to a system clock domain.

9. An input/output (I/O) data cache comprising:
a data storage area in communication with both a system data bus and an I/O data bus;
an address storage area configured to store system addresses corresponding to data contemporaneously stored in the data storage area;
first means for indicating whether data stored within the data storage area is available for immediate access from the I/O data bus;
second means for indicating whether data stored within the data storage area is available for immediate access from the system data bus; and
a state machine configured to generate an I/O Valid signal in response to a completed fetch operation, whereby data is fetched from system memory into the data storage area.

10. The data cache as defined in claim 9, further including a second state machine configured to generate an invalidate signal in response to coherency transactions on the system data bus.

11. A method for caching data in a shared relationship between a system data bus and an input/output (I/O) data bus comprising the steps of:
providing a single data storage area in communication with both a system data bus and an I/O data bus;
providing a single address storage area configured to store system memory addresses corresponding to data contemporaneously stored in the data storage area; and
duplicating a portion of validation circuitry in both a system frequency domain and an I/O frequency domain, whereby latency delays encountered when crossing a frequency domain boundary are encountered during non-critical times.

12. The method as defined in claim 11 wherein a critical path for data transfers from the I/O frequency domain to the system frequency domain occur in a context of performing snoopy cache coherency operations.

13. The method as defined in claim 11 wherein a critical path for data transfers from the system frequency domain to the I/O frequency domain occur in a context of performing data fetches from system memory to the I/O data bus.

14. The method as defined in claim 11 wherein the step of duplicating a portion of validation circuitry includes providing a bit that indicates a validity status of data within the data storage area for accesses from the I/O data bus.

15. The method as defined in claim 11 wherein the step of duplicating a portion of validation circuitry includes providing a bit that indicates a validity status of data within the data storage area for accesses from the system data bus.

* * * * *